United States Patent [19]

Jongman et al.

[11] Patent Number: 4,809,332

[45] Date of Patent: Feb. 28, 1989

[54] SPEECH PROCESSING APPARATUS AND METHODS FOR PROCESSING BURST-FRICTION SOUNDS

[75] Inventors: Allard Jongman; James D. Miller, both of St. Louis, Mo.

[73] Assignee: Central Institute for the Deaf, St. Louis, Mo.

[21] Appl. No.: 107,488

[22] Filed: Oct. 8, 1987

Related U.S. Application Data

[63] Continuation-in-part of Ser. No. 60,397, Jun. 9, 1987, which is a continuation-in-part of Ser. No. 792,965, Oct. 30, 1985.

[30] Foreign Application Priority Data

Oct. 29, 1986 [EP] European Pat. Off. ........ 86906693.6

[51] Int. Cl.[4] .............................................. G10L 1/00
[52] U.S. Cl. ........................................ 381/43; 381/42; 381/41; 381/44; 364/513.5
[58] Field of Search ..................... 381/29, 30, 31, 39, 381/40, 41, 42, 43, 44, 45, 48, 49, 50, 51, 52; 364/513.5; 400/120, 121

[56] References Cited

U.S. PATENT DOCUMENTS

| | | | |
|---|---|---|---|
| 3,076,932 | 2/1963 | Jaffe | 381/44 X |
| 3,172,954 | 3/1965 | Belar et al. | 179/1 |
| 3,619,509 | 11/1971 | Barger | 381/41 |
| 3,634,759 | 1/1972 | Koshikawa et al. | 324/77 |
| 3,679,830 | 7/1972 | Uffelman et al. | 179/1 SA |
| 3,881,097 | 4/1975 | Lehmann et al. | 235/156 |
| 3,946,157 | 3/1976 | Dreyfus | 381/43 |
| 4,057,756 | 11/1977 | Ley et al. | 324/77 B |
| 4,060,695 | 11/1977 | Suzuki et al. | 381/42 |
| 4,060,716 | 11/1977 | Pekrul et al. | 364/576 |
| 4,087,630 | 5/1978 | Browning et al. | 364/513.5 |
| 4,087,632 | 5/1978 | Hafer | 364/513.5 |
| 4,092,493 | 5/1978 | Rabiner et al. | 179/1 SD |
| 4,184,049 | 1/1980 | Crochiere et al. | 179/1 SA |
| 4,435,617 | 3/1984 | Griggs | 381/43 X |
| 4,489,434 | 12/1984 | Moshier | 381/43 |
| 4,489,435 | 12/1984 | Moshier | 381/43 |
| 4,610,023 | 9/1986 | Noso et al. | 381/43 |
| 4,661,915 | 4/1987 | Ott | 364/513.5 |
| 4,667,341 | 5/1987 | Watari | 381/43 |
| 4,736,429 | 4/1988 | Niyada et al. | 331/43 |

OTHER PUBLICATIONS

Delattre et al., "Acoustic Loci and Transitional Cues for Consonants", *J. Acoustical Soc. Am.*, vol. 27, No. 4, Jul. 1955, pp. 769–773.

Stevens et al., "Crosslanguage Study of Vowel Perception", *Language and Speech*, 1969, pp. 1–23.

Schafer et al., "System for Automatic Formant Analysis of Voiced Speech," *J. Acoustical Soc. Am.*, vol. 47, #2, Part 2, 1970, pp. 634–648.

Flanagan, *Speech Analysis Synthesis and Perception*, Second Edition, Springer–Verlag, 1972, pp. 194–197, 202–203.

Stevens, "Perceived Level of Noise by Mark VII and Decibels (E)," *J. Acoustical Soc. Am.*, vol. 51, No. 2 (Part 2), 1972, pp. 575–601.

(List continued on next page.)

Primary Examiner—William M. Shoop, Jr.
Assistant Examiner—Paul Ip
Attorney, Agent, or Firm—Senniger, Powers, Leavitt and Roedel

[57] ABSTRACT

Speech processing apparatus including an electronic memory and circuitry that derives from speech sets of digital values representative of frequency spectra. The spectra have peaks at frequencies associated therewith. The peaks include a highest magnitude peak for each spectrum. The circuitry also generates an auditory state signal representing the presence or absence of a burst-friction auditory state of the speech. Circuitry further electronically identifies, when the auditory state signal indicates the presence of a burst-friction auditory state, the highest magnitude peak for each spectrum as well as each peak having a magnitude within a range of magnitudes less than the magnitude of the highest magnitude peak, and selectively stores in distinct locations in the memory, respectively representative of normally occurring prominences of a burst-friction sound, the values of frequency of the lowest two frequencies associated with the identified peaks. Other speech processing apparatus and methods are also disclosed.

24 Claims, 14 Drawing Sheets

OTHER PUBLICATIONS

McCandless, "An Algorithm for Automatic Formant Extraction Using Linear Prediction Spectra", *IEEE Trans. Acoust., Speech, and Signal Process.*, vol. ASSP-22, 1974, pp. 135-141.

Miller, "Speech Processing Apparatus and Methods", May 7, 1987, World Intellectual Property Organization, International Bureau, International Publication No. WO87/02816, 93 pp.

Joos, "Acoustic Phonetics", *J. Ling. Soc. Am.*, vol. 24, No. 2, Suppl., Apr.-Jun. 1948, p. 104.

Rife et al., "Use of the Discrete Fourier Transform in the Measurement of Frequencies and Levels of Tones", *The Bell System Tech. J.*, 2/70, pp. 197, 198, 202-205.

Niederjohn et al., "Computer Recognition of the Continuant Phonemes in Connected English Speech", *IEEE Trans. on Audio and Electroacoustics*, vol. AU-21, No. 6, Dec. 1973, p. 526.

Marslen-Wilson et al., "Processing Interactions and Lexical Access during Word Recognition in Continuous Speech", *Cog. Psych. 10*, 1978, pp. 29-63.

Jain et al., "High-Accuracy Analog Measurements via Interpolated FET", *IEEE Trans. Inst. & Meas.*, vol. IM-28, No. 2, 1979, pp. 113-122.

*Periodic Progress Report No. 25*, Research Dept., Central Institute for the Deaf, 7.1.81-6.30.82; pp. ii, iii, 24-28.

Kasuya, "Japan's Drive for Speech Recognition", *Speech Tech.*, Sep./Oct. 1982, pp. 10, 12, 15-20.

Johnson, "Will Typewriters Ever Take Dictation?", *Speech Tech.*, Sep./Oct. 1982, pp. 35-42.

Ohga, "Recognition Board Cuts Both Size and Cost", *Speech Tech.*, Sep./Oct. 1982, pp. 82-85.

Miller, "BBB3. Auditory-perceptual Approaches to Phonetic Perception", *J. Acoust. Soc. Am.* Suppl. 1, vol. 71, Spring 1982, p., S112.

Siegel et al., "Voiced/Unvoiced/Mixed Excitation Classification of Speech", *IEEE Trans. Acoust. Speech & Sig. Processing*, 1982, pp. 451-460.

*Periodic Progress Report No. 26*, Research Department, Central Institute for the Deaf, 7.1.82-6.30.83, pp. ii, iii, 22-25.

Miller, "Sensory-Perceptual Dynamics and Categorization in Phonetic Perception", from Abstracts of the Sixth Midwinter Meeting of ARO, 1983, p. 76.

Reddy et al., "Recognizing Continuous Speech Remains an Elusive Goal", *IEEE Spectrum*, 11/83, pp. 84-87.

Scheffers, "Simulation of Auditory Analysis of Pitch: An Elaboration on the DWS Pitch Meter", *J. Acoust. Soc. Am.*, vol. 74, No. 6, 1983, pp. 1716-1725.

Miller, "Auditory Processing of the Acoustic Patterns of Speech", *Arch. Otolaryngol.*, vol. 110, 3/84, pp. 154-159.

Miller, "Auditory-Perceptual Correlates of the Vowel", *J. Acoust. Soc. Am.* Suppl. 1, vol. 76, 1984, Abstrct KK2, p. S79.

Micro Control Systems, "Capture 3-Dimensional Position Data in an Instant", 3 pp. including "3-D Digitizer with On-Board Intelligence Features Four Modes, High Accuracy", *EDN*, 5.31.8, p. 84.

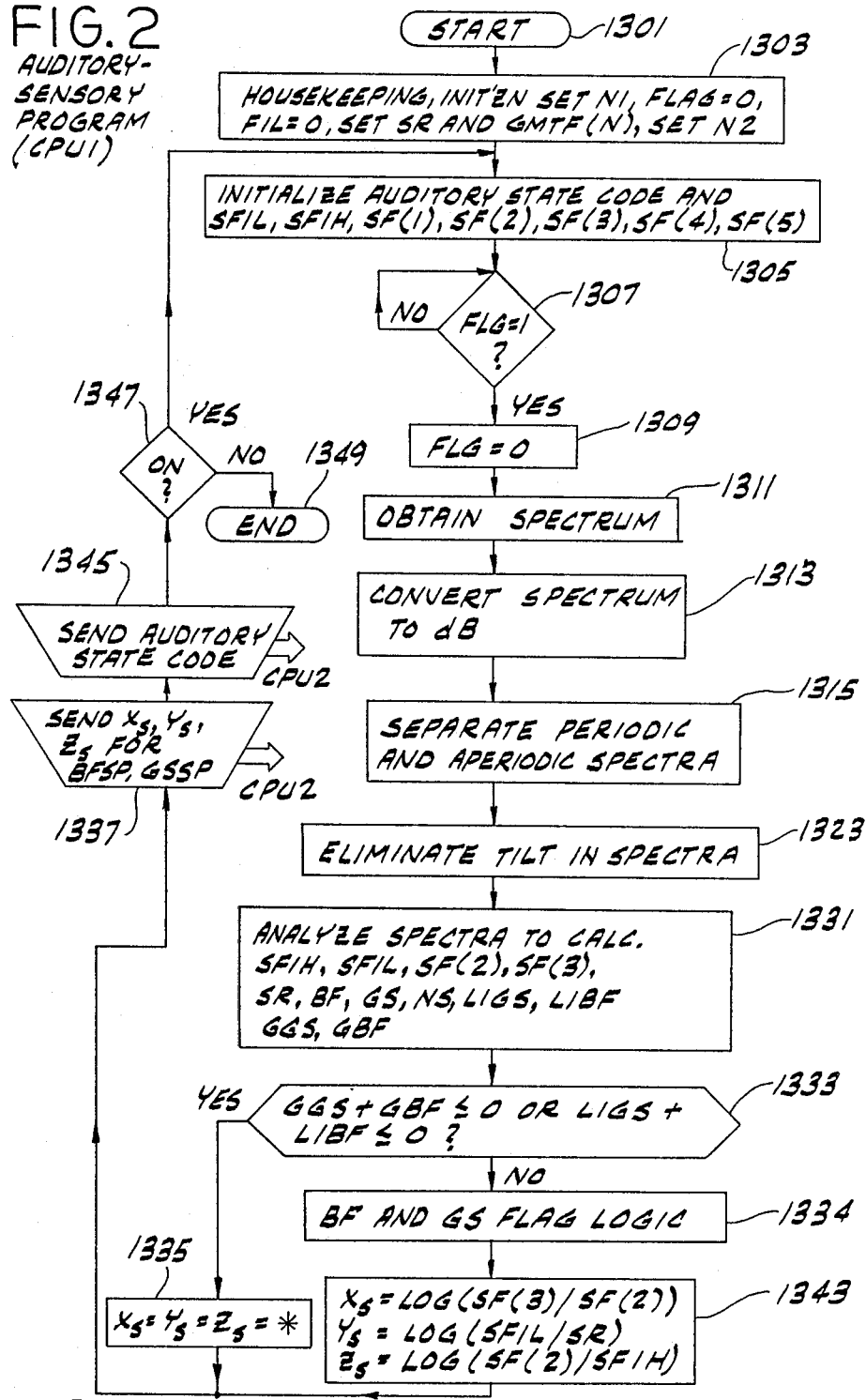

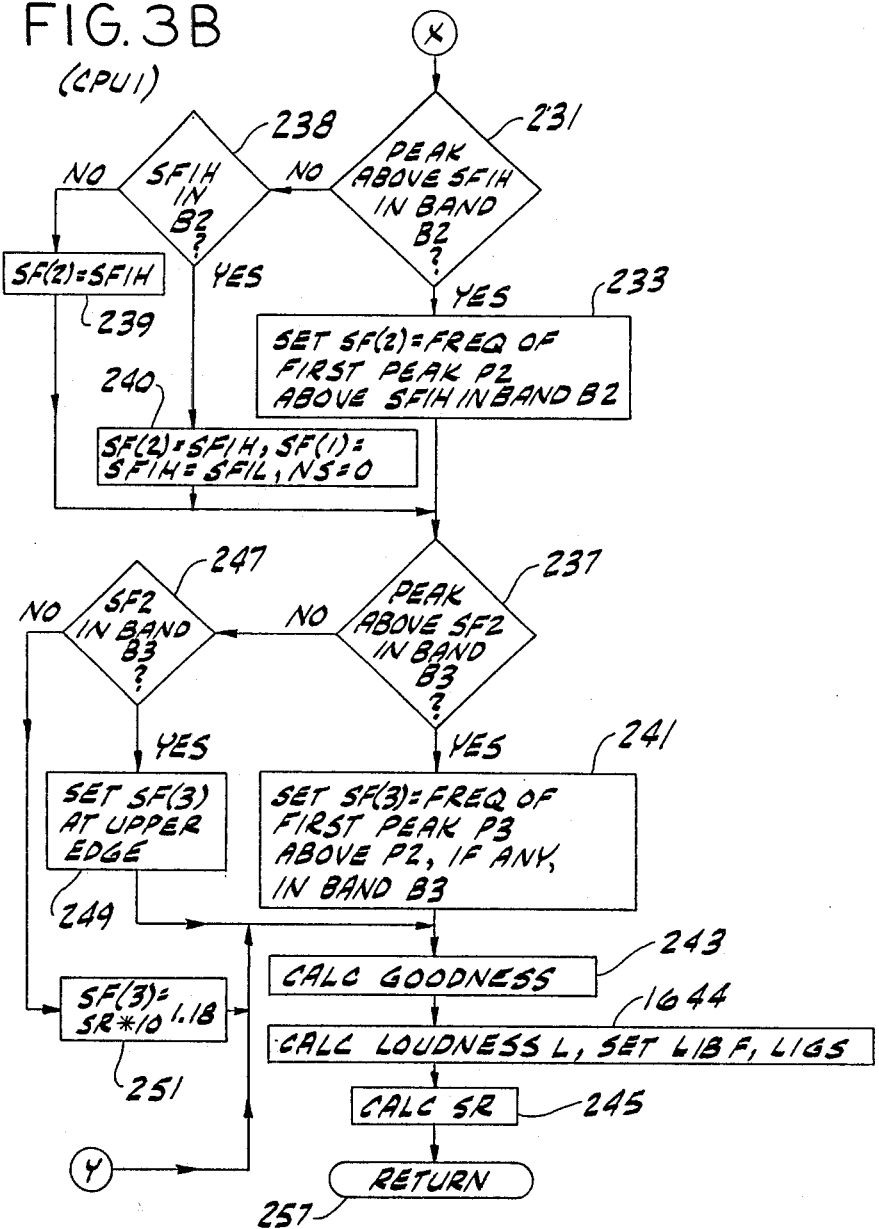

(CPU1)

BURST-FRICTION PROCESSING IN 1615

© 1987 CENTRAL INSTITUTE FOR THE DEAF

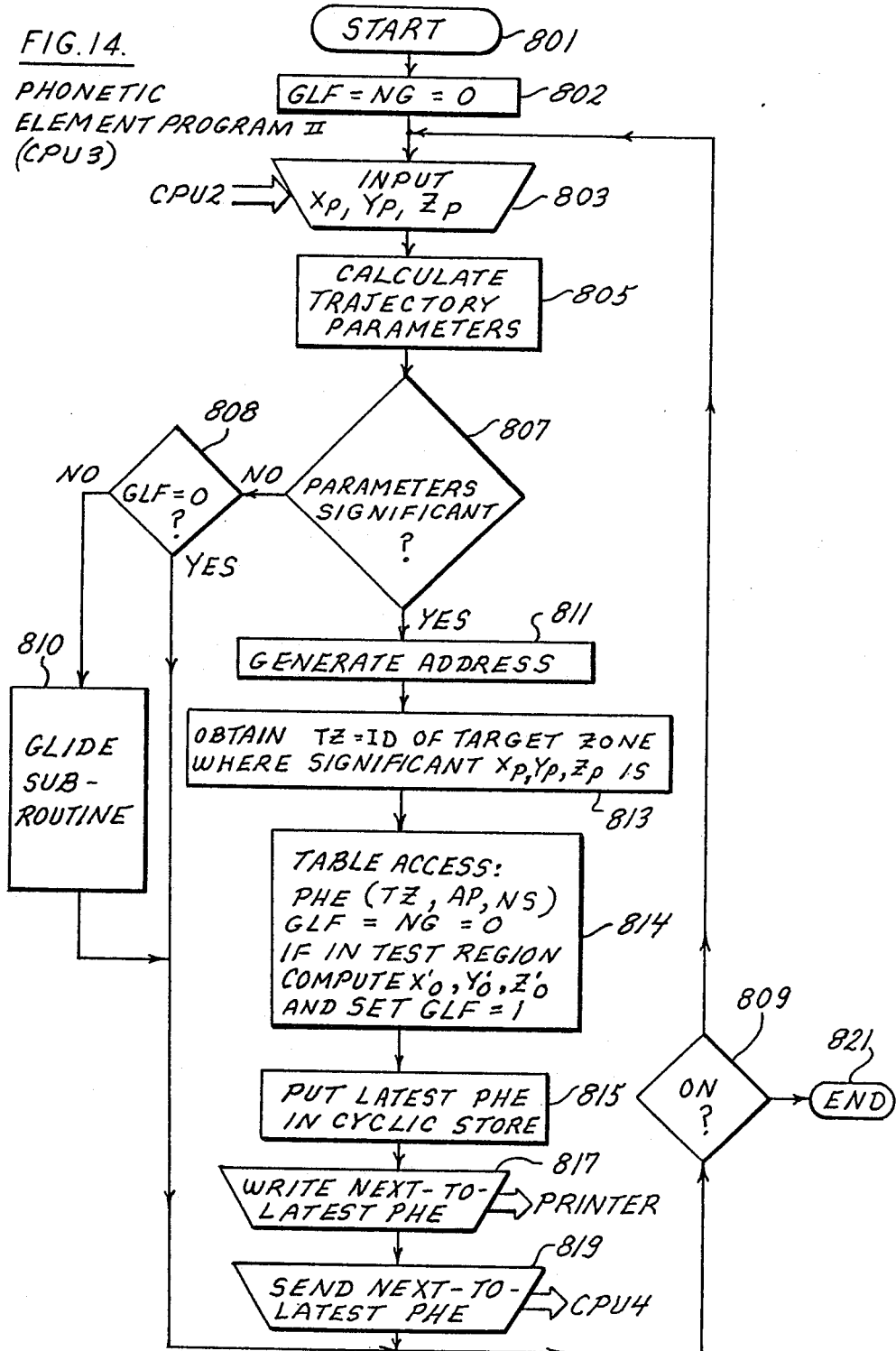
FIG. 14. PHONETIC ELEMENT PROGRAM II (CPU 3)
© 1987 CENTRAL INSTITUTE FOR THE DEAF

SPEECH PROCESSING APPARATUS AND METHODS FOR PROCESSING BURST-FRICTION SOUNDS

GOVERNMENT SUPPORT

This invention was made with Government support under Grant No. AFOSR-86-0335 awarded by Air Force. The Government has certain rights in this invention.

CROSS-REFERENCE TO RELATED APPLICATIONS

The present application is a continuation-in-part of coassigned U.S. patent application Ser. No. 060,397 filed June 9, 1987 which in turn is a continuation-in-part of coassigned U.S. patent application Ser. No. 792,965 filed Oct. 30, 1985.

Notice

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to speech processing apparatus and methods. More particularly, the present invention relates to improved apparatus and methods for use in automatic speech recognition technology to process a class of speech sounds called burst-friction sounds.

The present patent application is also directed to improvements in speech processing apparatus and methods over those described in coassigned J. D. Miller U.S. patent application Ser. No. 060,397 filed June 9, 1987, which provides an extensive description of a new speech processing technology and is incorporated herein by reference.

Speech, as it is perceived, can be thought of as being made up of segments or speech sounds. These are the phonetic elements, the *phonemes*, of a spoken language and they can be represented by a set of symbols, such as International Phonetic Association symbols.

These segments are linguistic units and have their bases in speech as it is perceived and spoken. All of the syllables and words of a language are made up of a relatively small number of phonetic elements. For example, in the case of English, textbooks in phonetics may list as few as 25 consonants and 12 vowels for a total of 37 phonemes. If the finer phonetic distinctions are included, then the list of distinguishable speech sounds or *phones* may lengthen to as high as 50 or 60.

Burst-friction spectra are involved in the perception of voiced plosives (e.g. /g/, /d/, and /b/) and voiceless aspirated and unaspirated stops or plosives (e.g. sounds of k, t or p), voiceless fricatives (e.g. s, h, sh, th in "both", f and wh) and voiced fricatives (e.g. z, zh, j, v and th in "the"). Thus, burst-friction spectra participate in a large part of the speech sound inventory of most natural languages. Other types of speech sounds include the nasal consonants, the approximants, and the vowels.

It has been proposed that the phonemes of a spoken language can be understood in terms of a small set of distinctive features numbering about 12. These features have their bases in articulatory, perceptual, and linguistic analyses. A feature approach is often used in textbooks on phonetics as the phones and phonemes are described in terms of place of articulation and manner of articulation.

There are several viable theories of speech perception attempting to explain how the human listener processes an incoming acoustic waveform of speech and translates that waveform into a series of linguistic elements such as phonemes or words. All of the current theories can be cast into a generic three-stage model, with the acoustic input undergoing three stages of processing in a bottom-up sequence. Stage 1 is an auditory-sensory analysis of the incoming acoustic waveform whereby representation of the signal is achieved in auditory-sensory terms. Stage 2 is an auditory-perceptual transformation whereby the spectral output of stage 1 is transformed into a perceptual form relevant to phonetic recognition. Here the spectral descriptions are transformed into dimensions more directly relevant to perception. For example, in various theories the perceptual form may be related to articulatory correlates of speech production or auditory features or pattern sequences. Finally, there is stage 3 in which the perceptual dimensions of stage 2 are transformed by a phonetic-linguistic transformation into strings of phonemes, syllables, or words. Stages 2 and 3 also are influenced by top-down processing wherein stored knowledge of language and events and recent inputs, including those from other senses in addition to language as heard, are brought into play.

Some work in automatic speech recognition has involved a narrow-band spectral analysis performed on a time-windowed speech waveform. In one system described in "Recognizing continuous speech remains an elusive goal" by R. Reddy et al., IEEE Spectrum, Nov., 1983, pp. 84–87, incoming digitized signals are broken into centisecond slices and spectrally analyzed. Each slice is compared with a collection of sound prototypes and the prototype closest to each slice is entered into a sequence. The prototype sequence is then used to roughly categorize the initial sound of the word, which in turn is used to produce word hypotheses Each word is then tested by creating a probability matrix and a cycle of operation repeats for the next word until an entire sentence is identified.

U.S. Pat. No. 4,667,341 discusses a continuous speech recognition system directed to the problem of reducing the probability of false recognition.

The exact mechanisms and processes involved in the perception of speech are even yet not fully understood in the art. However, the theoretical and technological framework for speech processing described in the coassigned J. D. Miller incorporated patent application has opened up a new direction in automatic speech processing.

Still further improvements in recognition of speech sounds are needed in the art, and one of the areas where improvements are particularly desirable is in the processing of burst-friction speech sounds to make them more accurately distinguishable by automatic speech recognition apparatus. A paper by Stevens, K. N. et al., "Crosslanguage Study of Vowel Perception", *Lang. and Speech*, Vol. 12, pp. 1–23 (1969, FIGS. 9 and 12 dealing with stop consonants) discusses which peaks are perceptually significant, in spectra generated for consonants that are already-known beforehand. However, reverse determinations now sought to accurately characterize unknown burst-friction speech sounds from their spectra are seemingly contradictory and unpredictable.

SUMMARY OF THE INVENTION

Among the objects of the present invention are to provide improved speech processing apparatus and methods for processing speech sounds that include burst-friction spectra to make them more accurately distinguishable by automatic speech recognition apparatus; to provide improved speech processing apparatus and methods for recognizing particular peaks in sounds that include burst-friction spectra, which particular peaks are significant to the framework for speech processing described in the coassigned J. D. Miller incorporated patent application; to provide improved speech processing apparatus and methods for automatically selecting particular spectral peaks in burst friction speech sounds of unknown identity for automatic speech recognition purposes which more frequently correspond with those peaks which could be picked out (as characterizing the particular speech sounds) by scientific specialists reviewing spectra already knowing beforehand the identity of each speech sound which was uttered; to provide speech processing apparatus and methods which are feasible alternatives to those already known in the art; to provide improved speech processing apparatus and methods which are relatively low in computer burden when implemented in software and relatively uncomplicated when implemented in hardware; and to provide improved speech processing apparatus and methods which are accurate, economical and reliable.

Generally, one form of the invention is a speech processing apparatus including an electronic memory and circuitry that derives from speech sets of digital values representative of frequency spectra. The spectra have peaks at frequencies associated therewith. The peaks include a highest magnitude peak for each spectrum. The circuitry also generates an auditory state signal representing the presence or absence of a burst-friction auditory state of the speech. Circuitry further electronically identifies, when the auditory state signal indicates the presence of a burst-friction auditory state, the highest magnitude peak for each spectrum as well as each peak having a magnitude within a range of magnitudes less than the magnitude of the highest magnitude peak, and selectively stores in distinct locations in the memory, respectively representative of normally occurring prominences of a burst-friction sound, the values of frequency of the lowest two frequencies associated with the identified peaks.

Other apparatus and methods of speech processing are also comprehended in the invention. Other objects and features will be in part apparent and in part pointed out hereinafter.

BRIEF DESCRIPTION OF THE DRAWINGS

FIG. 2 is a flow diagram of operations improved according to methods of the present invention for a main routine of CPU1 of FIG. 1;

FIGS. 3A and 3B are two parts of a flow diagram further detailing operations in the main routine of FIG. 2 improved according to methods of the present invention;

FIG. 14 is a flow diagram of operations for calculating trajectory parameters and testing them to determine points on the path where a predetermined condition is satisfied, and for implementing a complex target zone method and a glide detection method.

Corresponding reference characters indicate corresponding parts throughout the several views of the drawings.

DETAILED DESCRIPTION OF PREFERRED EMBODIMENTS

Preferred embodiments of the present invention are next described as an improved version of apparatus and methods disclosed in the incorporated patent application Ser. No. 060,397 of J. D. Miller incorporated by reference hereinabove. Parts of that patent application including some of its drawing FIGS. 1, 45, 13A, 13B, 15, 16, 17 and 33 are adapted as part of the present detailed description and as FIGS. 1, 2, 3A, 3B, 13, 11, 12 and 14 respectively. Corresponding numerals are preserved wherever possible as between this detailed description and the incorporated patent application, and the disclosure of that application supplements the disclosure herein wherever not inconsistent.

Figure 1:
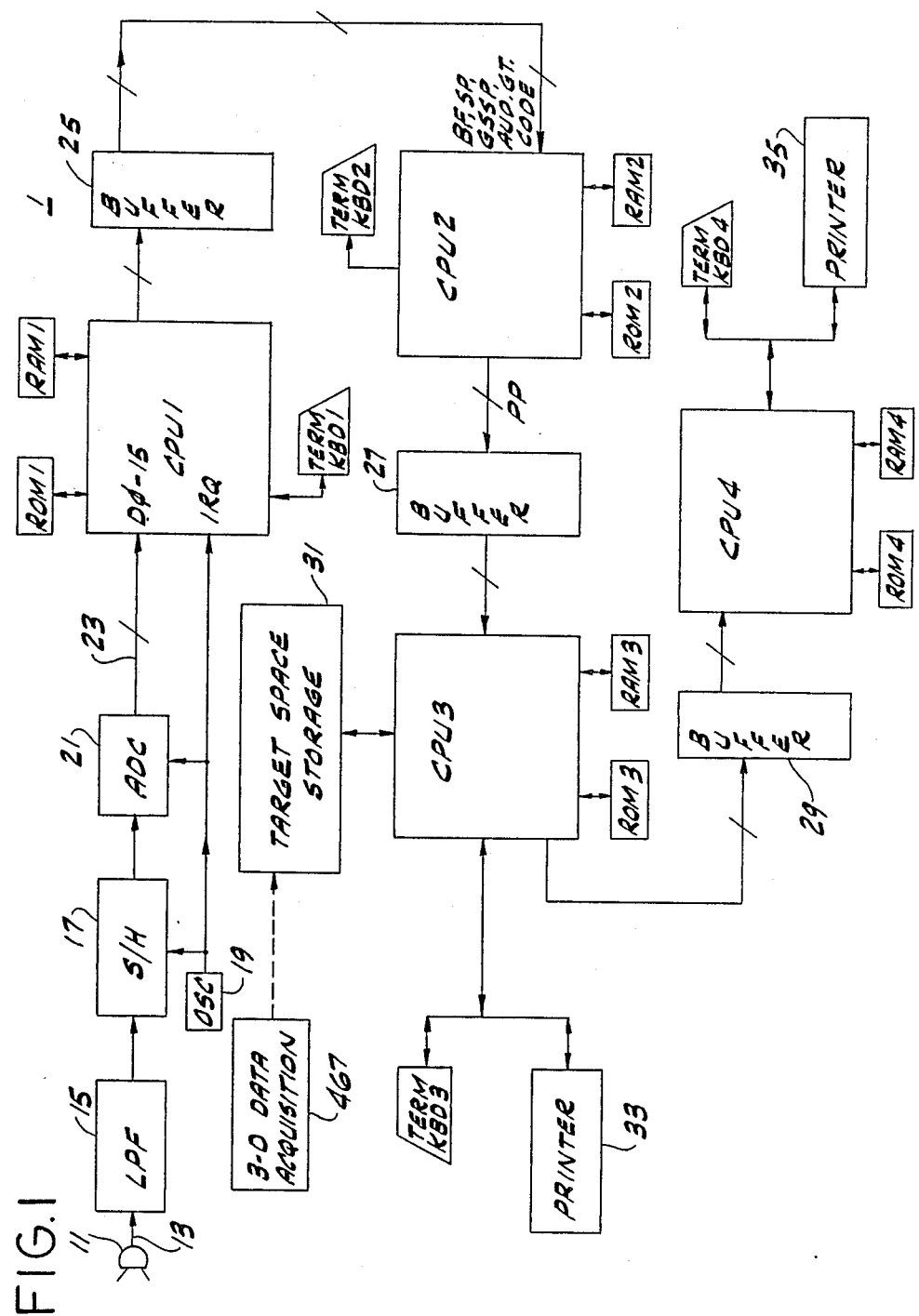
FIG. 1 is a block diagram of speech processing apparatus according to and operating by methods of the present invention.

In FIG. 1 a speech processing system 1 of the invention has a microphone 11 for converting sound pressure variations of an acoustic waveform of speech to an analog electrical signal on a line 13. System 1 performs a short-term analysis on the speech waveform that allows it to represent, once every millisecond, the spectral shape and the auditory state of the incoming speech. This sensory processing serves as an input to a higher level perceptual electronic system portion. The perceptual electronic system portion integrates sensory information over time, identifies auditory-perceptual events (or "sounds"), and converts the sensory input into a string of symbols or category cods corresponding to the phonetic elements of a human language.

The electrical signal on line 13 is filtered by an antialiasing low pass filter 15 and fed to a sample-and-hold (S/H) circuit 17. S/H circuit 17 is enabled by an oscillator 19 at a sampling frequency such as 20 KHz. and supplies samples of the analog electrical signal to an analog-to-digital converter (ADC) 21 where the samples are converted in response to oscillator 19 to parallel digital form on a set of digital lines 23 connected to data inputs of a first central processing unit CPU1. CPU1 reads in the latest sample in digital form upon interrupt by oscillator 19 at interrupt pin IRQ every 50 microseconds.

CPU1 is one of four central processing units CPU1, CPU2, CPU3 and CPU4 in FIG. 1, which respectively have programmable read only memory (ROM1, ROM2, ROM3 and ROM4), random access memory (RAM1, RAM2, RAM3 and RAM4), and a video terminal- keyboard unit (TERMKBD1, TERMKBD2, TERMKBD3, and TERMKBD4). CPU1 generates data for CPU2 which is buffered by a data buffer 25. CPU2 generates data for CPU3 which is buffered by a data buffer 27, and CPU3 generates data for CPU4 which is buffered by a data buffer 29. CPU3 has a memory 31 of approximately 2 megabyte or otherwise sufficient capacity that holds prestored phonetically relevant information indicative of different phonetic representations, target zone identifications, and glide zone (glide nucleus or radical) identifications corresponding to respective sets of addresses in the memory. CPU3 is provided with a printer 33 for recording phonetic element information in the order obtained by it from memory 31.

CPU4 is in one application shown in FIG. 1 programmed as a lexical access processor for converting the phonetic element information into plaintext and printing it out on a printer 35 to accomplish automatic dictation. CPU4 in some applications, such as a hearing aid embodiment or other intelligent sound system embodiment, is programmed additionally, or instead, to process the phonetic elements and synthesize speech therefrom and make it audible using an electroacoustic output transducer in a manner adapted to ameliorate hearing deficiencies or otherwise produce modified speech based on that entering microphone 11. CPU4 in still other applications acts as a bandwidth compressor to send the phonetic elements through a telecommunication system along with other phonetic elements from a different speech channel with which the first speech phonetic elements are multiplexed. CPU4 in yet further applications is programmed with artificial intelligence or expert systems software to interpret the phonetic elements and to produce a printed response, a synthesized speech response, a robotic response controlling computers or other electronic devices or electromechanical apparatus in home, office or factory, or to produce any other appropriate response to the speech sensed on line 13.

In FIG. 2, operations of CPU1 commence with a START 1301 and housekeeping and initialization 1303, 1305, 1307 and 1309 as described in the incorporated patent application.

Next in a step 1311 CPU1 computes a FFT (Fast Fourier Transform) spectrum with a resolution of 2 to 5 Hertz on a current window sample. For example, with a sampling rate of 20,000 Hertz, there are 20 samples per millisecond. Using a 24 millisecond time weighting function such as a Hamming window or a Kaiser-Bessel window, there are 480 samples. For computation purposes, the 24 milliseconds is then padded out with enough zeros to form an effective transformable time domain function having 8192 (8K) points, or about 410 milliseconds (2.5 Hertz resolution). Accordingly, the Fast Fourier Transform is computed on the 480 samples plus 7712 zeros in step 1311. In this way a spectrum with a resolution below 50 Hertz and preferably below 30 Hertz and even 10 Hertz is advantageously obtained so that the periodic (harmonic) spectrum of the speech can be separated from the aperiodic spectrum without confusion with the line spacing in the Fourier Transform itself.

Next a step 1313 converts the spectrum so derived to decibels as discussed in connection with step 121 of the incorporated patent application.

A step 1315 separates the periodic and aperiodic spectra as discussed in connection with FIGS. 41–44 of the incorporated patent application to obtain a smoothed periodic spectrum and a smoothed aperiodic spectrum corresponding to the latest incoming spectrum from step 1311. The separation process utilizes, for example, a harmonics sieve procedure or any other procedure which suffices to accomplish the separation.

Figure 4:
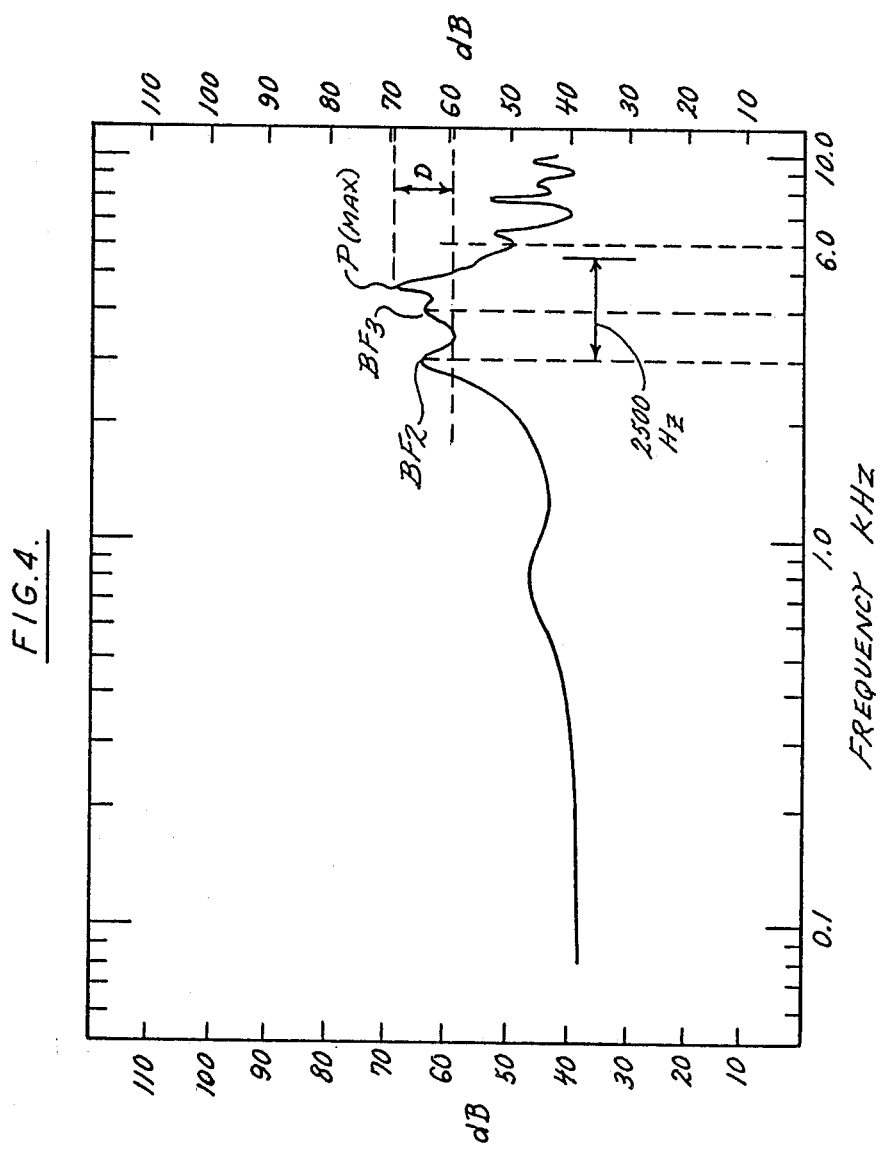
FIGS. 4, 5 and 6 are graphs of intensity or sound pressure level SPL in decibels versus frequency of the sound in kiloHertz comprising spectra of three speech sounds.

Operations continue with a step 1323 analogous to step 123 of FIG. 4 of the incorporated application wherein the periodic spectrum and aperiodic spectrum are processed to eliminate tilt from each.

For the present burst-friction speech processing purposes, however, the original periodic spectrum with tilt and aperiodic spectrum with tilt are also kept on file in memory for further use as well.

Reviewing what has been said, the speech waveform is multiplied by time-window weighting functions of 5–40 millisecond duration but shifted in 1.0–2.5 millisecond steps. Thus the successive time intervals defining the windows can be either overlapping or distinct. The window duration and step size as related to bursts, transitions and relatively steady-state segments are adjusted for best performance. The short-term spectrum is calculated for each segment by either DFT or linear prediction analysis (LPA). The DFT, of course, produces a line spectrum with components at integral multiples of the reciprocal of the window length while the LPA produces a smoothed spectral envelope—transfer function—with detail dependent on the number of LP-parameters selected. Either spectrum is represented in log-magnitude by log-frequency dimensions. Operations accomplish or approximate the following. The spectrum is "windowed" in the log frequency domain so that the amplitudes are represented in sensation levels or loudness levels. The spectrum is subjected to smoothing filters one of which is similar to the critical-band. Another minimizes confusing minor spectral peaks. Finally, the spectral envelope is subjected to high-pass filtering in the log-frequency domain to eliminate spectral tilt.

It is contemplated that the skilled worker provide sufficient computer speed in CPU1 or provide an auxiliary DMA (direct memory access) processor to accomplish the processing described for the various operations detailed herein.

Continuing in FIG. 2, operations execute a step 1331 by executing the operations of FIGS. 3A and 3B first for the smoothed periodic P spectrum and then for the smoothed aperiodic AP spectrum obtained as hereinabove-described. The various values and flags respective to the spectra are separately stored temporarily.

To characterize these spectra with relatively few variables, each latest spectrum is analyzed in step 1331 so that three spectral frequencies SF1, SF2 and SF3 are computed. (When these frequencies are part of a table they are equivalently designated SF(1), SF(2) and SF(3).) The spectral frequencies SF1, SF2 and SF3 are in some cases the frequencies at which peaks occur, and the manner of determining them is described more specifically in connection with FIGS. 3A and 3B hereinafter. Distinct lower and higher values SF1L and SF1H are computed for SF1 when nasality is present. A spectral frequency reference SR is also computed to indicate the overall general pitch (timbre) of the speech so that voices with high pitch (timbre) and voices with low pitch (timbre) are readily processed by the system 1. Also in step 1331 an auditory state code or signal representing presence or absence of burst-friction auditory state BF, glottal source auditory state GS, nasality NS, loudness LIGS of glottal source sound, loudness LIBF of burst-friction sound, goodness GGS of glottal source sound and goodness GBF of burst-friction sound are determined from the spectrum.

Next in a decision step 1333 the speech goodness values GGS and GBF are tested and the loudness index values LIGS and LIBF are tested, and if none is positive or otherwise significant, speech is absent and operations branch to a step 1335. In step 1335 a set of registers in CPU1 or RAM1 (corresponding to a set of three coordinates called sensory pointer coordinates $X_s$, $Y_s$ and $Z_s$) are loaded with a code "*" indicating that the coordinates are undefined. Then in a step 1337 the contents of the registers for $X_s$, $Y_s$ and $Z_s$ are sent to CPU2 through buffer 25 of FIG. 1.

If in decision step 1333 the speech goodness and loudness are positive, operations proceed to a step 1334 which provides BF (burst-friction) and GS (glottal-source) flag logic to determine that the proper spectrum or spectra are used in a step 1343 to compute sensory pointer coordinates for each of glottal source and burst friction sensory pointers BFSP and GFSP. In step 1343 sensory pointer coordinate value $X_s$ is set equal to the logarithm of the ratio of SF3 to SF2, pointer value $Y_s$ is set equal to the logarithm of the ratio of SF1L to SR, and pointer value $Z_s$ is set equal to the logarithm of the ratio of SF2 to SF1H, whence step 1337 is reached. The equations of step 1343 are computed once except when glottal source and burst friction spectra are simultaneously present, as in voiced fricatives, in which case step 143 is executed twice to compute sensory pointer coordinates $X_{gs}$, $Y_{gs}$, $Z_{gs}$ for the glottal source spectrum and $X_{bf}$, $Y_{bf}$, $Z_{bf}$ for the burst-friction spectrum.

After sensory pointer coordinate values $X_s$, $Y_s$ and $Z_s$ are sent to CPU2 in step 1337, the auditory state signal coded quantities BF, GS, NS, LIGS, LIBF, GGS and GBF are also sent in a step 1345 to CPU2 through buffer 25. Then in a step 1347, a test is made to determine if an OFF-ON switch is on, and if not, operations terminate at END 1349. If the switch is on, as is normal, operations loop back to step 1305 for obtaining the next spectrum, analyzing it and sending information to CPU2 as described above. CPU1 thus executes operations continually to obtain spectral information about the samples of speech as they arrive in real time.

The auditory-spectral pattern at any moment in time is given by the auditory-spectral envelope in decibels dB (Phons or Sensation Level or equivalent) against log frequency. After appropriate processing of this envelope, the frequency values of a sensory reference SR, as well as SF1, SF2 and SF3 are found for the vocalic portions of speech. Vocalic portions are those segments or spectral components that ordinarily result from an acoustic source at the glottis and have the vocal tract, with or without the nasal tract, as a transmission path to the external air. Thus, voiced speech, which has periodic spectra, and whispers or aspirated sounds, which have aperiodic spectra, are the vocalic components of speech and have spectra called glottal-source (GS) spectra herein. One sign of the presence of a vocalic segment is a low-frequency prominence (P1) that can be associated with a first resonance of the vocal tract.

A sensory pointer for vocalic portions of speech has a position in a mathematical space, or phonetically relevant auditory-perceptual space, computed in step 1343 of FIG. 2. This pointer is called a glottal-source sensory pointer (GSSP). Usually SF1, SF2 and SF3 are the center frequencies of the first three spectral prominences in the auditory-spectral envelope 127 of FIG. 6 of the incorporated application. Sometimes, however, SF3 is interpreted as the upper edge of the spectral envelope when no clear peak P3 can be observed, such as when peaks P2 and P3 merge during a velar segment or is taken as being a fixed logarithmic distance over SR when P3 is absent. Spectral frequency SF1 generally corresponds to the center frequency of the first significant resonance of the vocal tract. However, during nasalization two peaks, or one broadened peak, appear near the first significant resonance. To take account of such spectral differences steps 1331 and 1343 of FIG. 2 herein are made sufficiently flexible to compute the sensory pointer position differently for nasalization spectra than for other spectra.

Figure 5:
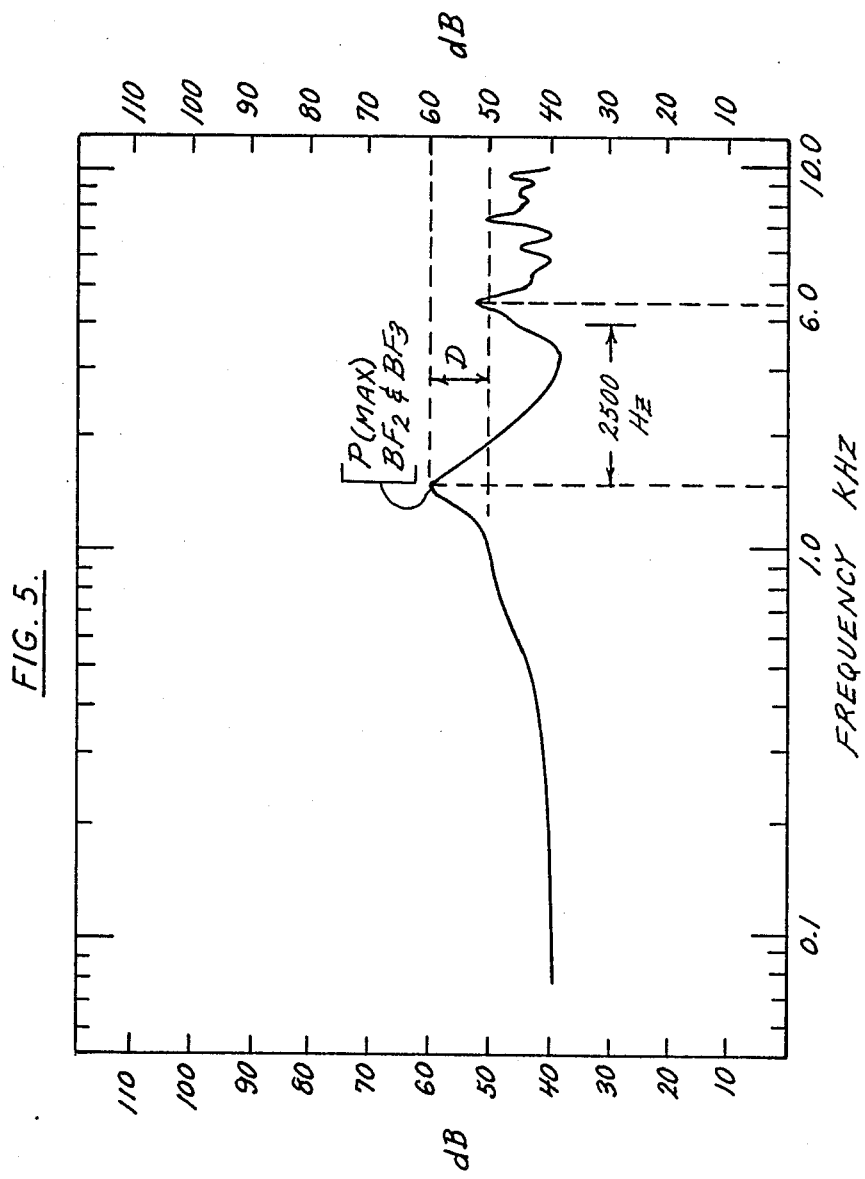
Figure 6:
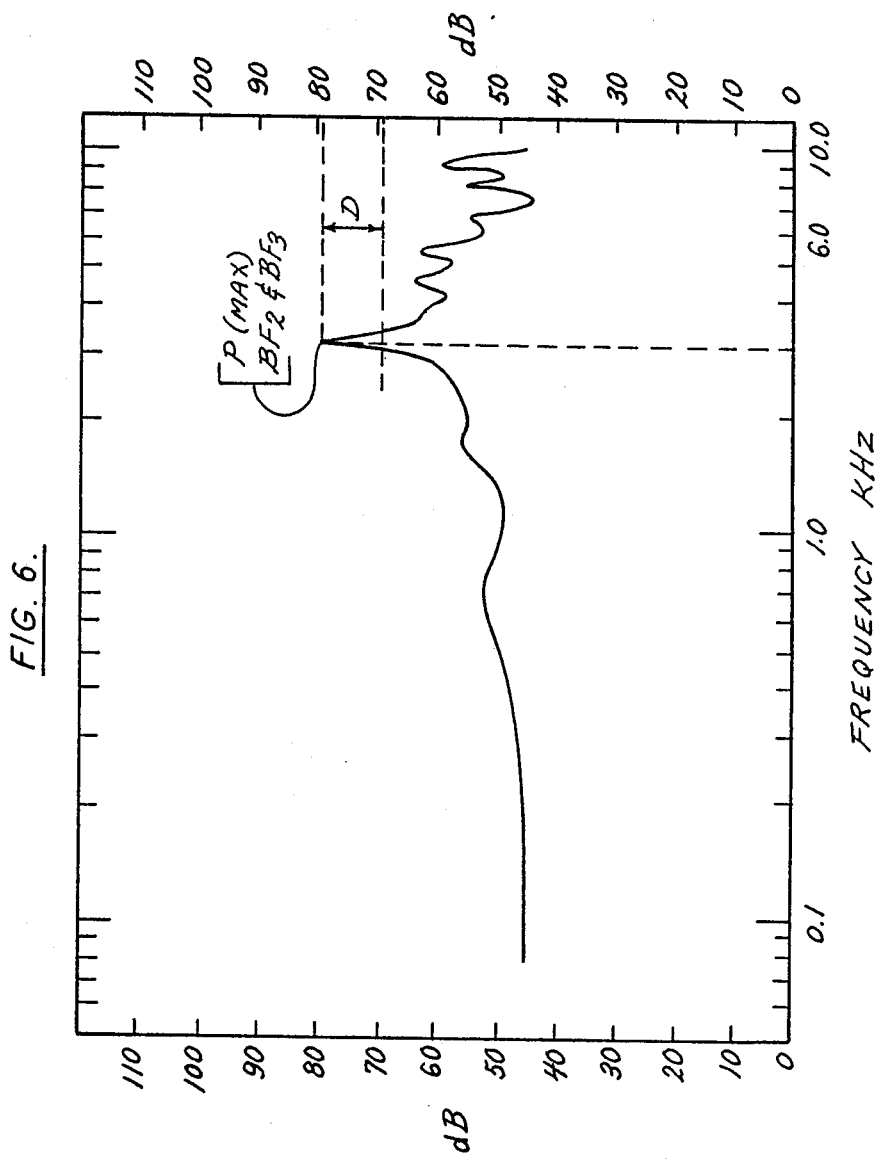

In another major class of spectra (burst-friction BF) suggested by the envelopes of FIGS. 4, 5 and 6 herein, there is no major low-frequency prominence as a glottal-source sound would have. Such spectra are associated with burst sounds and sustained friction sounds and are produced by a talker with supraglottal sources such as when the tongue meets or approximates the velum, palate, or teeth or at the teeth and lips, themselves. These spectra are referred to as burst-friction (BF) spectra herein. A BF spectrum is analyzed differently from a GS spectrum by CPU1 in order to produce spectral frequency values SF2 and SF3 and sensory reference value SR, and the position of the resulting sensory pointer values computed in step 1343 of FIG. 2 is in the $X_s$, $Z_s$ plane. Frequency values SF2 and SF3 are for the present purposes denominated BF2 and BF3 respectively when a BF spectrum is processed. The sensory reference SR value takes the place of SF1 (and SF1H and SF1L) in the calculations. The calculations of step 1343 then define the position of a pointer called the burst-friction sensory pointer (BFSP) which is distinct from the GSSP. CPU1 then acts as an example of means for electronically producing a set of signals representing coordinate values with a first coordinate value which is a function of a ratio of the values of frequency stored in the distinct memory location (e.g. log(BF3/BF2)), a second coordinate value which is substantially constant (e.g. log(SR/SR)), and a third coordinate value which is a function of a ratio of the lowest frequency associated with an identified peak to a reference frequency value (e.g. log(BF2/SR)).

As the incoming speech is analyzed in step 1331 of FIG. 2, the glottal-source GS code value is set to 1 in the auditory state signal whenever a glottal-source spectrum is above the auditory threshold. As the values of SR, SF1, SF2, and SF3 change, the GSSP is regarded as moving through a mathematical space, or auditory-perceptual space. The path of the GSSP is interrupted by silences and by burst-friction spectra. Then the GS value is set to zero and the BF value is set to 1 in the auditory state signal or code. In such case, the GSSP is replaced by the BFSP. The GSSP can be regarded as moving through the mathematical space as the glotta-source spectrum changes shape and sometimes this movement is nearly continuous as in the case of the sentence, "Where were you a year ago?", where the only interruption would occur during the friction burst of "g" in "ago." In other words the quantity GS in the auditory state code can remain at a value of one (1) through many spectra in various examples of speech, but the quantity BF in the auditory state code when set to one is generally reset to zero very shortly thereafter, because spectra which are not of the burst-friction type occur so soon thereafter. In terms of the mathematical space, burst-friction sensory pointer BFSP will usually appear and disappear shortly thereafter as friction sounds are inserted in the speech stream. As burst-friction spectra are unstable, the BFSP may exhibit considerable jitter, and it usually will not move in any smooth, continuous way in the mathematical space.

Often the quantity BF in the auditory state code is 1 when the quantity GS is zero, and vice versa. However, in the case of voiced fricatives, *both* BF and GS are equal to one simultaneously. In terms of the mathematical space, both of the sensory pointers are simultaneously present as one is associated with the glottal-source spectrum of the voiced part of the voiced fricative speech sound and the other is associated with the burst-friction spectrum of the friction part of the sound.

Returning to step 1334 it is noted that for many speech sounds the aperiodic AP spectrum lacks a first prominence and analysis of it in step 1331 therefore results in the burst-friction flag BF being set. Also, in many speech sounds the periodic P spectrum has a first prominence, causing glottal-source flag GS to be set in step 1331. Still other sounds have both glottal source and burst friction components occurring simultaneously, as in "v" or "z". In general, for these speech sounds the aperiodic AP spectrum provides the values for computation of the coordinates $X_s$, $Y_s$ and $Z_s$ of the burst-friction sensory pointer BFSP and the periodic P spectrum provides the values for computation of the coordinates $X_s$, $Y_s$ and $Z_s$ of the glottal source sensory pointer GSSP. For sounds in which the glottal source component predominates, and the burst friction component is weak or nonexistent, the BFSP, if computed, exerts a negligible influence since its loudness is low or zero. For sounds in which the burst friction component predominates, and the glottal source component is weak or nonexistent, the GSSP, if computed, exerts a negligible influence since its loudness is low or zero. If the skilled worker elects, a loudness test can be provided in step 1334 to turn off the BF or GS flag respective to a given AP or P spectrum if the AP or P spectrum respectively falls below a predetermined loudness level, instead of relying on low loudness to eliminate the influence of the weak spectrum in the difference equations (9A–C) and (9A'–C') of the incorporated patent application.

If the same flag is set for both the P and AP spectra, however, then a test for greater loudness is executed in step 1334 to determine which spectrum P or AP should be used in step 1343 to compute the coordinates for the sensory pointer (e.g. GSSP) associated with that flag. In this way, the spectrum with the greater loudness is used to determine the BF or GS nature of the sound.

CPU1 thus electronically produces sets of values representing both a periodic spectrum and an aperiodic spectrum from one of the frequency spectra of the speech and generates two sets of signals representing a glottal-source sensory pointer position and a burst-friction sensory pointer position from the sets of values representing the periodic spectrum and the aperiodic spectrum. CPU2 electronically derives coordinate values on a path of a perceptual pointer from both the glottal-source sensory pointer position and burst-friction sensory pointer position.

Figure 3A:
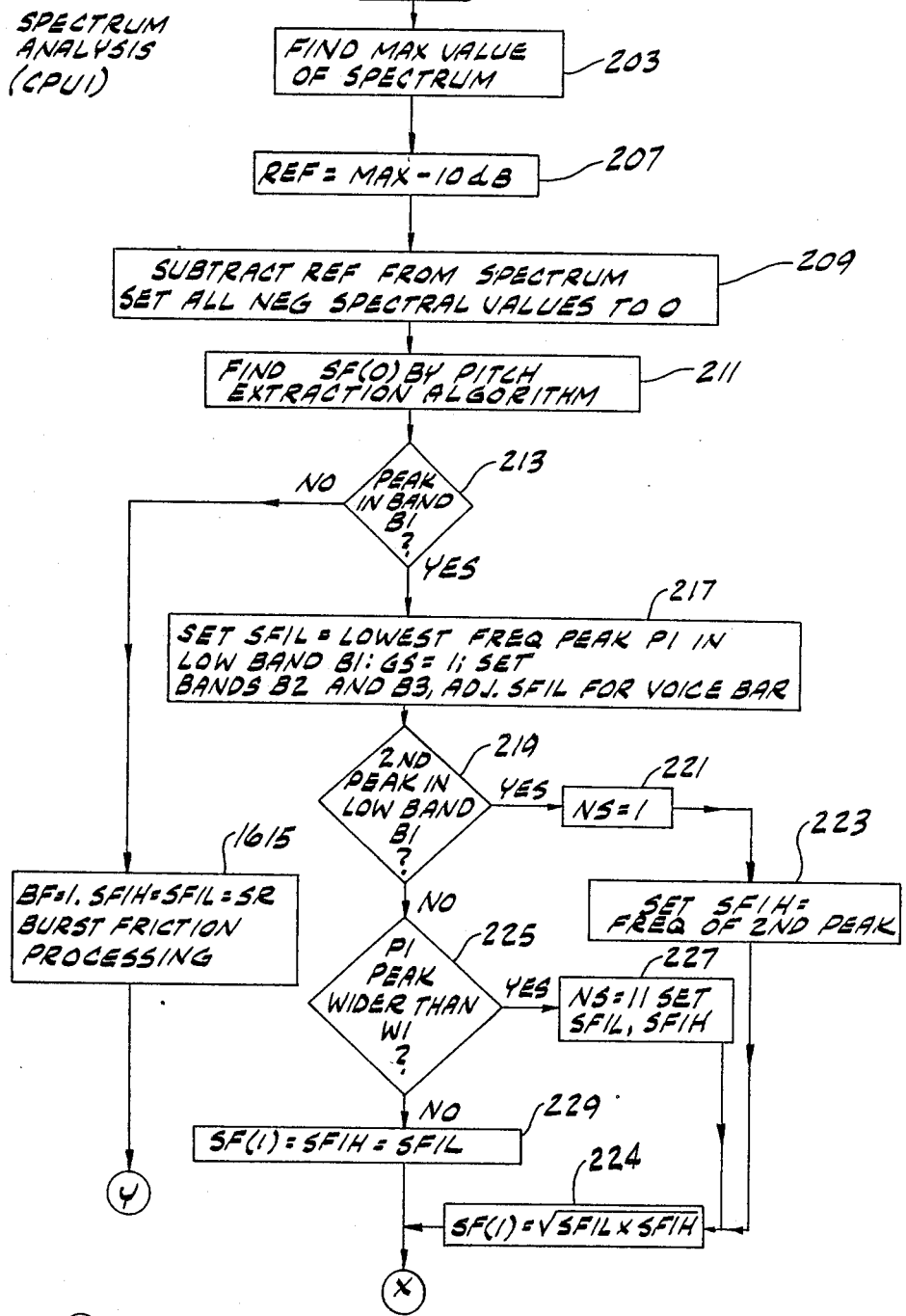

The operations performed by CPU1 in analyzing each spectrum in step 1331 of FIG. 2 are now described in sequence with reference to FIGS. 3A and 3B.

After a BEGIN 201, CPU1 in a step 203 finds the maximum value MAX, or highest peak, of the spectrum with tilt removed. This is illustratively accomplished by first setting to zero all spectral values which are less than a predetermined threshold decibel level, so that low sound levels, noise and periods of silence will not have apparent peaks. The nonzero values remaining, if any, are checked to find the highest value among them to find the value MAX.

Next, in a step 207 an appropriate preset value such as 15 db, or preferably 10 dB, is subtracted from the maximum value MAX to yield a reference level REF. In a following step 209 the level REF is subtracted from all of the M values in the DFT spectrum and all of the resulting negative values are set to zero to normalize the spectrum so that the reference line is zero dB and spectral values that fall below the reference are set to zero dB.

In a step 211 following step 209 the fundamental frequency is found by a pitch-extraction algorithm such as that of Scheffers, M. T. M. (1983) "Simulation of auditory analysis of pitch; An elaboration of the DWS pitch meter." J. Acoustic Soc. Am. 74, 1716-25, (see FIG. 6 of incorporated patent application) and stored as a spectral frequency SF0, or pitch.

In a decision step 213, CPU1 determines whether there are any positive normalized spectral values lying in a band B1 which is defined as 0 less than or equal to $\log_{10}(f/SR)$ less than or equal to 0.80, where SR is the spectral reference and f is frequency in Hertz. If at least one positive normalized spectral value is present in band B1, the spectrum is regarded as a glottal-source spectrum, and the spectrum (with tilt eliminated per step 1323) is next analyzed in each of three frequency bands B1, B2 and B3, as suggested beneath FIG. 8 of the incorporated patent application. These frequency bands are used as a way of discriminating the P1, P2 and P3 peaks and the frequency values selected to define each band are adjusted for best results with a variety of speaking voices. Steps 217-243 and steps 247-251 in FIGS. 3A and 3B for processing glottal-source spectra are the same as described in connection with FIGS. 13A and 13B of the incorporated patent application, and need no further description herein.

If step 213 of FIG. 3A determines that there are no positive normalized spectral values in the band B1, it is concluded that the spectrum is a burst-friction spectrum (although this may also be a period of silence) and a branch is made to a step 1615 where auditory state signal BF is set to 1 and the spectral higher and lower frequency values SF1L and SF1H are both set equal to sensory reference SR, so that the later operations of step 1343 of FIG. 2 compute the sensory pointer coordinate values correctly for the burst-friction spectrum.

Figure 9:
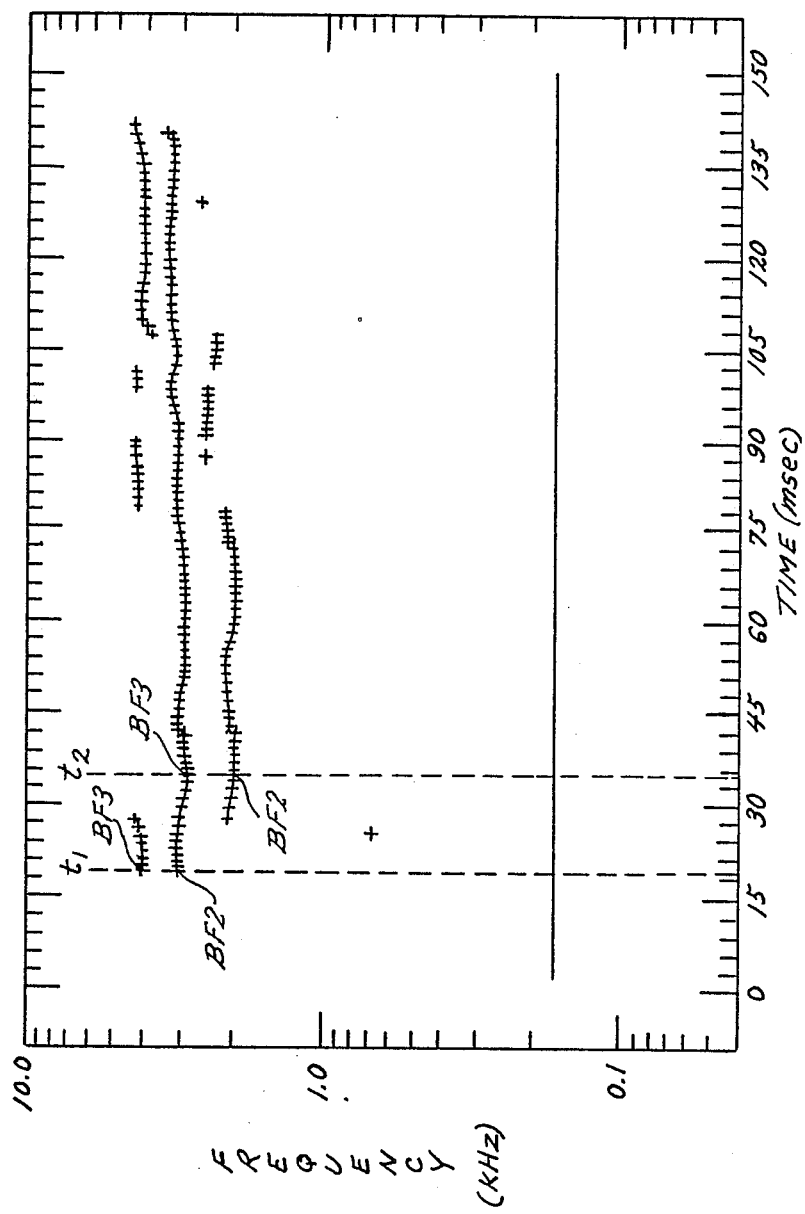
FIG. 9 is a graph of frequency in kiloHertz versus time in milliseconds depicting values of frequency BF2 and BF3 for storage in distinct locations in an electronic memory of FIG. 1 respectively representative of normally occurring prominences of a burst-friction sound.

In the present preferred embodiment a spectrum that is a burst-friction spectrum is not analyzed in the manner of FIG. 9 of the incorporated patent application and step 215 of FIG. 13A therein. Instead, step 1615 retrieves the set of digital data representing the corresponding stored spectrum with tilt remaining (see discussion of step 1323 hereinabove). Step 1615 processes each set of digital data representative of that burst-friction spectrum with tilt, ignoring any information above 6 kHz., as described in detail hereinbelow in connection with spectrum FIGS. 4-6 herein and in the flow diagram of operations of FIG. 7.

After execution of step 1615 operations pass through a point Y to step 243 of FIG. 3B where the speech goodness is computed. Next in a step 1644, the loudness of the latest spectrum is computed according to a procedure described in Stevens, S. S., "Perceived Level of Noise by Mark VII and Decibels (E), *J. Acoust. Soc. Am.*, Vol. 51, 2(2), pp. 575-601 (1972), and used to calculate LIBF or LIGS and stored in a register for LIBF or LIGS depending on whether the latest spectrum is burst-friction or glottal-source respectively. Operations proceed from step 1644 to calculate sensory reference SR in step 245 whence a RETURN 257 is reached.

Burst-friction processing operations of step 1615 are now illustrated and discussed in connection with FIGS. 4-6. The determinations that are needed are seemingly contradictory and unpredictable. However, operations according to the flow diagram of FIG. 7 have been discovered which provide accurate characterizations of burst-friction spectra.

FIG. 4 shows a burst spectrum of [t] as produced in the word 'teen' by a male speaker. A highest magnitude peak P(max) is located at 4523 Hz, with an amplitude of 69 dB. Operations of step 1615 should establish burst friction prominences BF2 at 2924 Hz (65 dB), and BF3 at 3905 Hz (65 dB), even though the two peaks selected are not as prominent as highest magnitude peak P(max).

FIG. 5 shows a burst spectrum of [k] as produced in the word 'cot' by a male speaker. The highest magnitude peak P(max) for this spectrum is located at 1400 Hz (60 dB). Operations of step 1615 should establish both burst friction prominences BF2 and BF3 at the same frequency of 1400 Hz since the next peak (4366 Hz, 54 dB) is separated too widely in frequency from the first peak to be of interest.

FIG. 6 shows a burst spectrum of [k] as produced in the word 'ken' by a female speaker. The highest magnitude peak P(max) is located at 3112 Hz and is much more prominent than higher-frequency peaks located nearby. Operations of step 1615 should disregard the higher-frequency peaks even though they are not separated very widely from the first peak.

Figure 7:
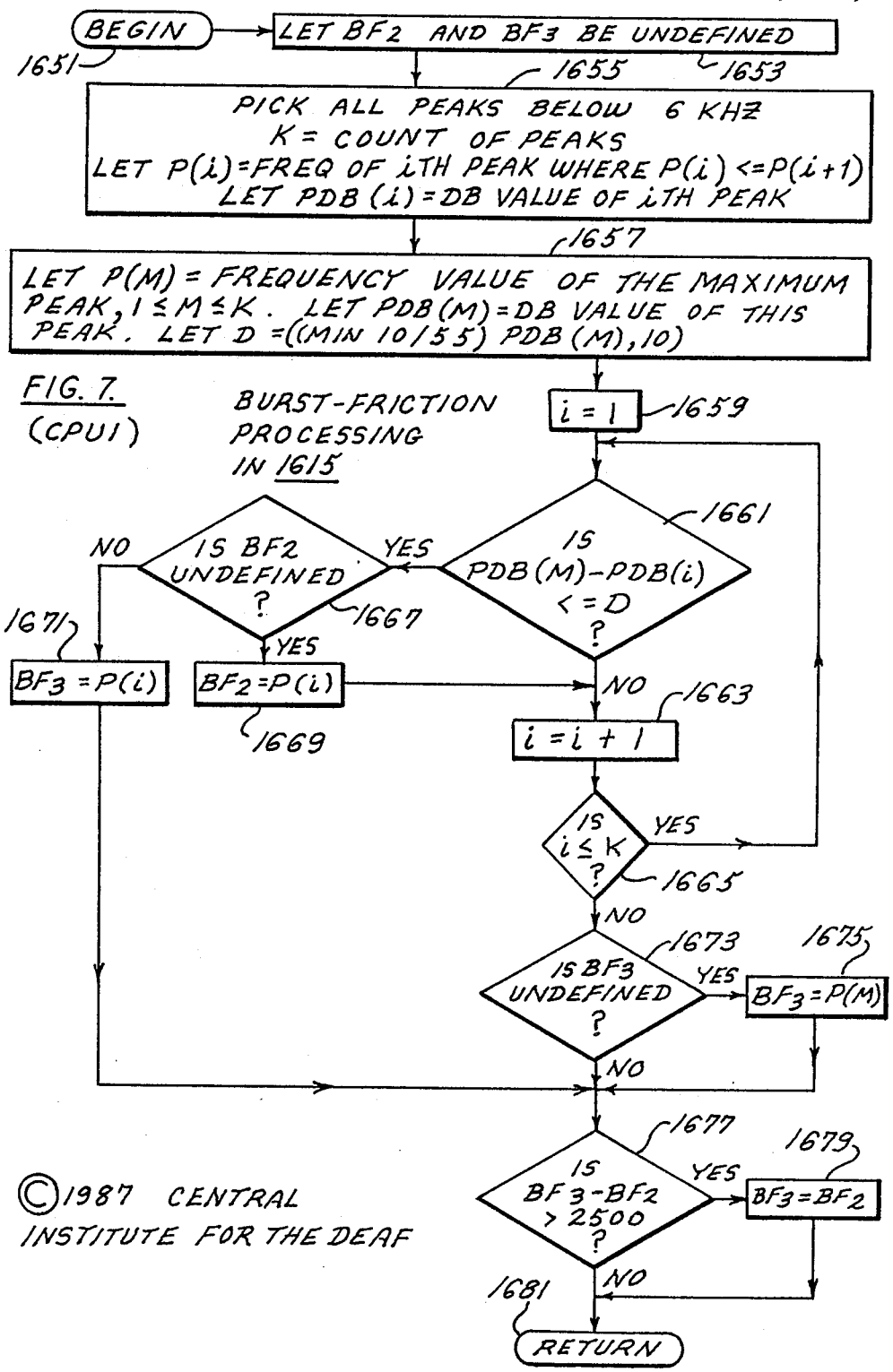
FIG. 7 is a flow diagram of a burst-friction processing method of the invention for use in a step in FIG. 3A.

The operations of the processing method illustrated in FIG. 7 faithfully achieve the seemingly contradictory determinations. A burst-friction processing part of step 1615 of FIG. 3A commences with a BEGIN 1651 of FIG. 7 and then goes to a step 1653 in which undefined frequencies BF2 and BF3 which are ultimately to be determined are first initialized. Next in a step 1655 all peaks below 6 kHz (6000 Hertz) are selected by a peak detection routine. In this way only those peaks which are below a preset frequency of 6 kHz are identified in a frequency band of 0-6 kHz. The number of these peaks is counted and stored as a number K. The frequencies of the peaks are temporarily stored in serial order such that the frequency P(i) of the peak with index i is less than the frequency of the peak P(i+1) with the next higher index i+1. Also, the peak intensity in decibels of sound pressure level (SPL) is indexed and stored as a series of values PDB(i).

Succeeding step 1657 scans the series of values PDB(i) for a value M of the index i at which the highest magnitude of PDB(i) occurs. Step 1657 then accesses the frequencies P(i) for frequency P(M) of the peak with index i=M at which the highest magnitude peak occurs. In this way, the center frequency of a spectral peak with maximum amplitude below 6 kHz, P(M) (also called P(max) herein), is located.

The method of FIG. 7 electronically identifies, when the auditory state signal indicates the presence of a burst-friction auditory state, the highest magnitude peak for each spectrum as well as each peak having a magnitude within a range of magnitudes less than the magnitude of the highest magnitude peak. This range of magnitudes has a breadth D, also called an amplitude cutoff, as shown in FIGS. 4-6. The range of magnitudes is substantially constant in breadth D, preferably 10 decibels when the highest magnitude peak P(max) is above a predetermined intensity such as 55 decibels. This 10 decibel range is quite suitable in processing speech signals at conversational intensity levels ranging from 55 to 75 dB.

Figure 8:
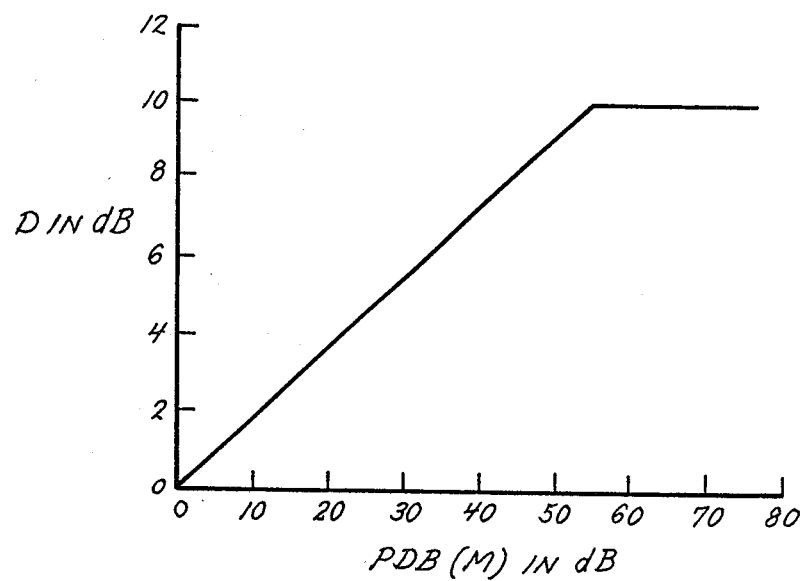
FIG. 8 is a graph of breadth D in decibels of an intensity range for use in a method of the invention, versus intensity in decibels of a highest magnitude peak in a speech sound spectrum.

Advantageously, if speech signals with lower intensity levels than 55 dB are involved, the breadth D is made to vary directly with the intensity in decibels of the highest magnitude peak, as shown in FIG. 8. In FIG. 8, amplitude cutoff D as a function of high magnitude peak intensity PDB(M) is level or constant between 55 and 75 dB, and decreases as PDB(M) intensity decreases. This important feature is implemented in FIG. 7 wherein step 1657 computes breadth D according to the equation $$D = MIN((10/55) \times PDB(M), 10) \tag{1}$$

In words, equation (1) corresponds to the graph of FIG. 8 of range breadth D in decibels versus intensity of the highest magnitude peak PDB(M). When the intensity is less than 55 dB, then breadth D is 10/55 of the intensity PDB(M). In other words a narrower range than 10 dB is used in FIGS. 4-6 when the highest peak is less than 55 dB. When the intensity is 55 dB or greater, the breadth D is 10 dB.

After step 1657, a search in FIG. 7 is made through the peaks indexed by index i. First, a step 1659 sets index i to one. Then a step 1661 determines whether the peak indexed by the current value of index i is within the decibel range that has breadth D. Step 1661 thus tests whether the difference PDB(M) less PDB(i) is less than or equal to breadth D. If not, the current peak is ignored, and operations go to a step 1663 to increment index i by one. If index i is still less than or equal to the number K of peaks in a step 1665, operations loop back to step 1661 until a peak within the magnitude range is found, whence operations branch to a test step 1667. Step 1667 determines whether BF2 still is not determined, as indicated by BF2 still having its initialized value from step 1653. If BF2 is undetermined, operations go to a step 1669 to set BF2 to the frequency P(i) corresponding to the current value of index i, whence the loop is reentered at step 1663. If BF2 is already determined (BF2 unequal to its initialized value), then a branch is made from step 1667 to a step 1671 to set BF3 to the frequency P(i) corresponding to the current value of index i instead.

If in step 1665 it is found that all of the peaks have been examined, operations proceed to a step 1673 to determine whether BF3 remains undefined (BF3 still equal to its initialized value). If still undefined, then a branch is made to a step 1675 to set BF3 equal to the frequency P(M) of the highest magnitude peak. After either of steps 1671 and 1675, or if test step 1673 finds BF3 is defined, then operations proceed to a step 1677 to determine whether the burst-friction prominence values BF2 and BF3 so determined have frequencies which differ by more than 2500 Hertz. The 2500 Hertz range is thus independent of the sensory reference SR, and effectively floats in the 6 kHz voice band. If BF2 and BF3 do differ by more than 2500 Hertz, a branch is made to a step 1679 to set BF3 equal to BF2 whence a RETURN 1681 is reached. If BF2 and BF3 do not differ by more than 2500 Hertz, RETURN 1681 is reached directly from step 1677.

In overall effect, the FIG. 7 burst-friction processing moves from about 60 Hz to 6000 Hz in the spectrum, and often the first two peaks within 10 dB of the level of the maximum peak are picked as BF2 and BF3. Thus, in those cases where there are two peaks within 10 dB of, and to the left of, the maximum peak, the maximum itself would not be picked, as illustrated in FIG. 4. However, in those cases where BF2 has been picked and BF3 is separated from BF2 by 2500 Hz or more, the frequency value of BF2 is also used as that for BF3, due to steps 1677 and 1679, as is shown in FIGS. 5 and 7. If there are no peaks within 10 dB of the maximum peak, the frequency value for the maximum peak is used for both BF2 and BF3, due to steps 1673 and 1675, as shown o FIGS. 6 and 7. Another way of understanding the operations is that they establish a test whether there are two peaks that differ in frequency by 2500 Hz or less. If not, then the value of frequency of the identified peak which is lowest in frequency is stored in both distinct memory locations BF2 and BF3. If there is only one peak, it is the identified peak which is lowest in frequency and thus its frequency is stored as BF2 and BF3.

The method was experimentally tested by hand for speech stops /p/, /t/ and /k/ using 36 spectra from a male speaker and 36 spectra from a female speaker. A 24 millisecond Hamming window was centered over the onset of the burst. The spectral peak with maximum amplitude below 6 kHz was located. Then moving from left to right, the center frequencies of the first two peaks within 10 dB of the maximum were picked as the burst-friction components BF2 and BF3, with the exceptions discussed above such as when there is only one peak or a higher frequency peak was separated from BF2 by 2500 Hz or more. The process yielded determinations of the three speech stops which were correct in 96% of the cases.

The process of FIG. 7 is applied repeatedly to successive spectra of a burst-friction sound at intervals such as every millisecond. Accordingly, BF2 and BF3 can be graphed as a function of time, as shown in FIG. 9. In FIG. 9, a burst spectrum of [t] as produced in the word 'teen' by a male speaker, is graphed as a function of time. BF2 and BF3 are displayed for each millisecond of burst-friction signal as lower and upper plus signs respectively. Due to the scale of the graph, the plus signs merge into line segments. However, presence on the same line segment does not indicate identity of interpretation. For instance at a time $t_2$, the frequency interpreted as BF3 is about the same as the frequency earlier interpreted as BF2 at a time $t_1$.

Figure 10:
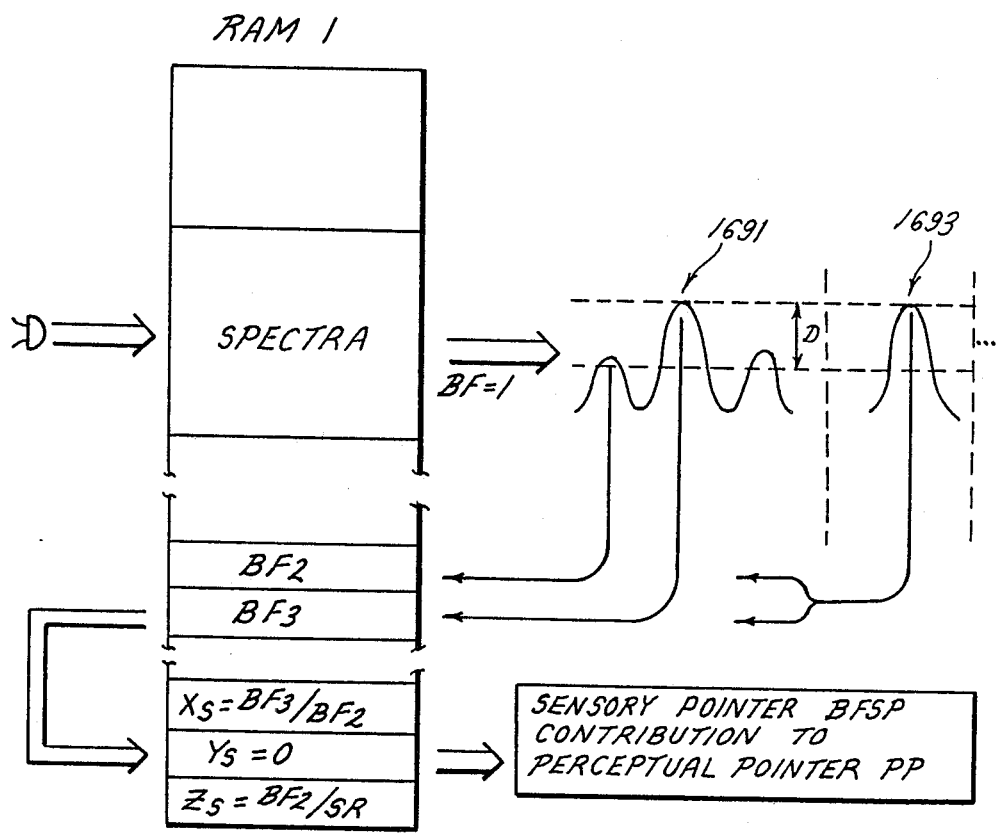
FIG. 10 is a memory map of an electronic memory of FIG. 1 associated with spectrum diagrams and legends to illustrate methods of the invention.

In FIG. 10, operations according to the preferred embodiment as discussed above produce sets of digital values stored in RAM1 of FIG. 1 in a memory area marked SPECTRA. The spectra are repeatedly computed to update them, resulting in a series of spectra 1691, 1693, . . . and so on over time. Processing of each new spectrum according to the method of FIG. 7 produces new burst-friction prominence values BF2 and BF3 in RAM1. For instance, the frequencies of the two leftmost peaks in spectrum 1691 are stored as values BF2 and BF3 respectively. Subsequently, spectrum 1693 which has only one peak, occurs, and the frequency of the one peak is stored as the value of both BF2 and BF3. In this way the processing selectively stores in distinct locations in the memory (e.g. BF2 and BF3) respectively representative of normally occurring prominences of a burst-friction sound, the values of frequency of the lowest two frequencies associated with the identified peaks. In other cases, the processing instead stores in both distinct locations in the memory the value of frequency of the highest magnitude peak when there are no other identified peaks. In still other cases, it stores in both distinct locations in the memory the lowest value of frequency associated with an identified peak when the lowest two frequencies associated with the identified peaks differ by at least a predetermined value of frequency.

Concurrently, processing converts the values of BF2 and BF3 into burst-friction sensory pointer BFSP coordinates $X_s$, $Y_s$ and $Z_s$ where $X_s = BF3/BF2$, $Y_s = 0$ and $Z_s = BF2/SR$.

The BFSP coordinates of FIG. 10 then contribute to a path of a perceptual pointer PP of FIGS. 11 and 12 according to equations as described in greater detail in connection with FIGS. 15 and 16 of the incorporated patent application. In this way, circuits and methods are provided for electronically producing a set of coordinate values for a sensory pointer in a mathematical space from the values (e.g. BF2 and BF3) in the distinct memory locations, and electronically deriving a series of coordinate values of a perceptual pointer on a path in a mathematical space with a contribution from the set of coordinate values for the sensory pointer.

Figure 12:
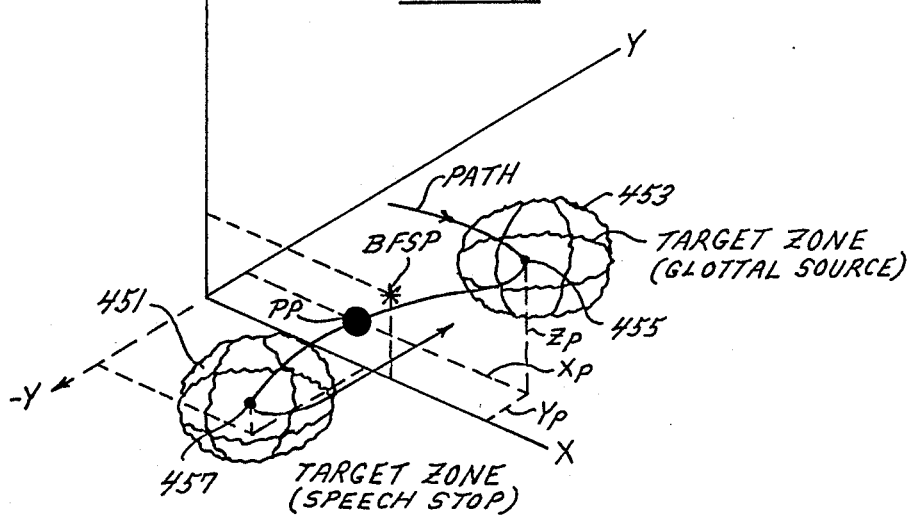
FIG. 12 is a simplified diagram of the mathematical space of FIG. 11, showing target zones for two phonetic elements, and showing a trajectory or path traced out by the perceptual pointer in the mathematical space.

As shown in FIGS. 1 and 12 herein the memory or target space storage 31 holds prestored information representative of a speech stop sound at addresses corresponding to a region 451 of the mathematical space which cannot be entered by the sets of coordinate values for the sensory pointer BFSP.

Figure 11:
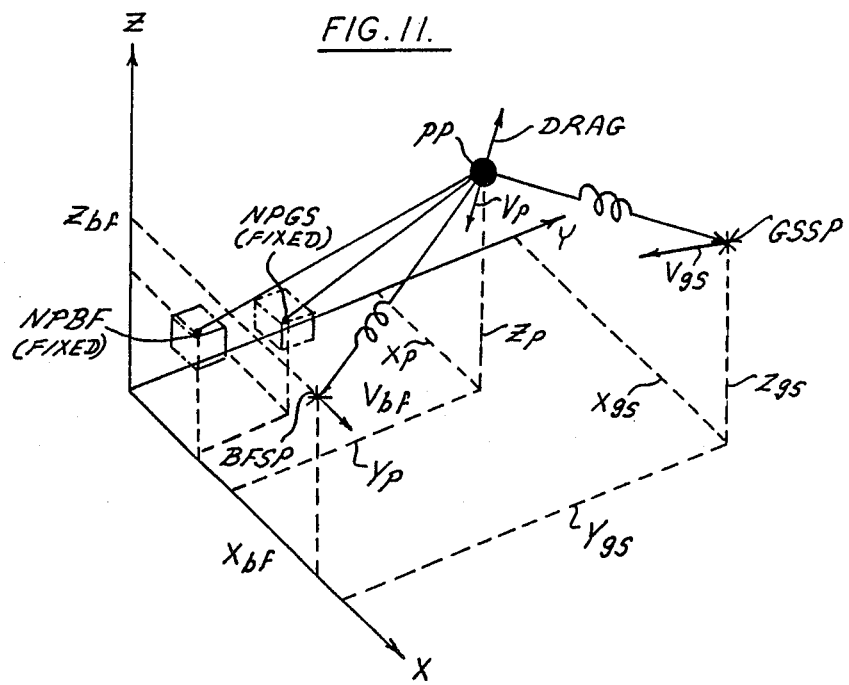
FIG. 11 is an illustration of a mathematical model for converting from sensory pointer coordinates to coordinates $X_p$, $Y_p$ and $Z_p$ of a perceptual pointer in a three dimensional mathematical space.
Figure 13:
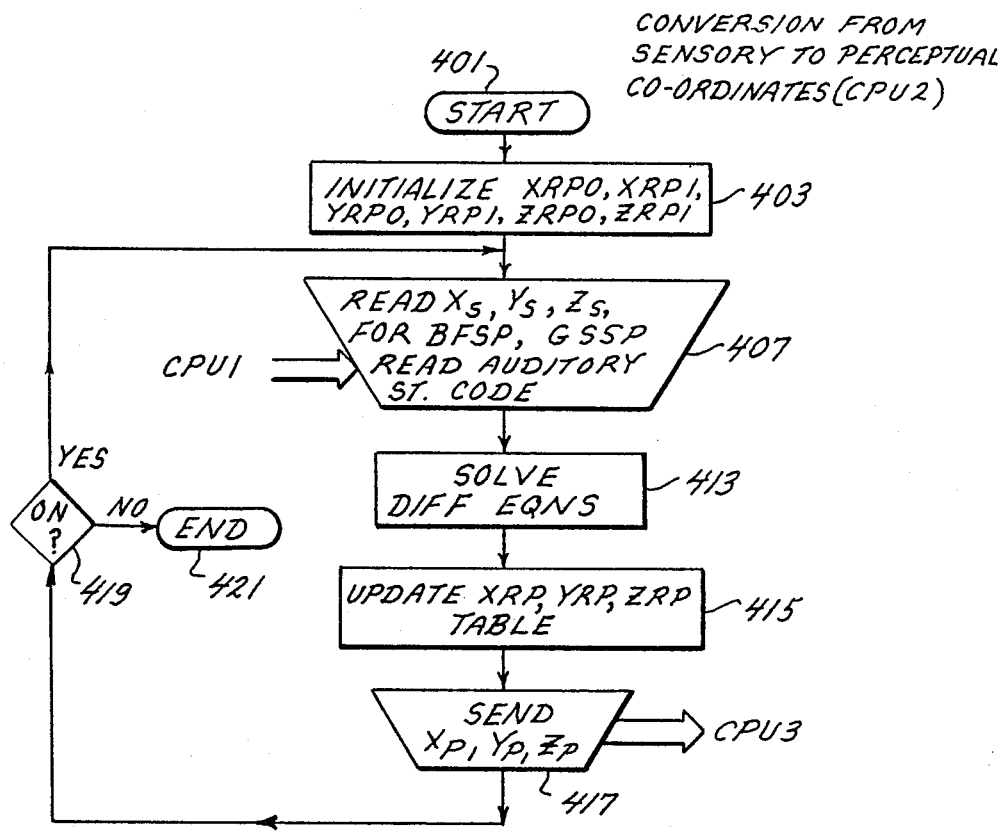
FIG. 13 is a diagram of operations according to a method in a unit CPU2 of FIG. 1 for converting from sensory pointer coordinate values to coordinate values on a path having perceptual significance.

FIG. 13 shows operations for implementing the model of FIGS. 11 and 12 in a digital computer so that difference equations are solved for the latest points on the path of the perceptual pointer PP. In this way a series of coordinate values of the perceptual pointer PP on a path in a mathematical space are electronically derived with a contribution from the set of coordinate values for the sensory pointer.

FIG. 14 further shows operations for detecting points such as 455 and 457 of FIG. 12 where perceptual pointer PP has a significant trajectory parameter. Target space storage memory 31 holds prestored phonetically relevant information such as identifiers of phonetic elements corresponding to respective sets of addresses in the memory. CPU2 electronically derives per FIG. 13 a series of coordinate values of points on a path in the mathematical space as a function of repeatedly determined values of frequency (e.g. BF2 and BF3) selectively stored in the distinct memory locations when the auditory state signal represents a burst-friction sound. In FIG. 14 CPU3 electronically computes values of a trajectory parameter from the series of coordinate values. When one of the values of the trajectory parameter satisfies a preestablished condition, CPU3 determines an address in memory 31 corresponding to coordinates of a position where the preestablished condition is satisfied, and obtains from the memory 31 the prestored phonetically relevant information corresponding to the address so determined. Glides are also detected. The various operations of FIG. 14 are numbered to correspond with the description of FIG. 33 of the incorporated patent application.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Speech processing apparatus comprising:
   memory means;
   first means for deriving from speech sets of digital values representative of frequency spectra, the spectra having peaks at particular and frequencies, the peaks including a highest magnitude peak for each spectrum, and for generating an auditory state signal representing the presence or absence of a burst-friction auditory state of the speech; and
   second means for electronically identifying, when the auditory state signal indicates the presence of a burst-friction auditory state, the highest magnitude peak for each spectrum as well as each peak having a magnitude within a range of magnitudes less than the magnitude of the highest magnitude peak, and for selectively storing in distinct locations in the memory, respectively representative of normally occurring prominences of a burst-friction sound, the values of frequency of the lowest two particular frequencies of the identified peaks.

2. Speech processing apparatus as set forth in claim 1 wherein said second means also includes means for instead storing in both distinct locations in the memory the lowest particular frequency of an identified peak when the lowest two particular frequencies of the identified peaks differ by at least a predetermined value of frequency.

3. Speech processing apparatus as set forth in claim 2 wherein the predetermined value of frequency is approximately 2500 Hertz.

4. Speech processing apparatus as set forth in claim 1 wherein said second means also includes means for instead storing in both distinct locations in the memory the value of frequency of the highest magnitude peak when there are no other identified peaks.

5. Speech processing apparatus as set forth in claim 1 wherein the range of magnitudes is substantially constant in breadth when the highest magnitude peak is above a predetermined intensity.

6. Speech processing apparatus as set forth in claim 1 wherein the range of magnitudes has a breadth in decibels which varies directly with the intensity in decibels of the highest magnitude peak for intensities of the highest magnitude peak below a predetermined intensity.

7. Speech processing apparatus as set forth in claim 1 wherein said second means includes means for identifying only those peaks which are below a preset frequency.

8. Speech processing apparatus as set forth in claim 7 wherein said preset frequency is approximately six kiloHertz.

9. Speech processing apparatus as set forth in claim 1 wherein said first means includes means for generating another auditory state signal indicative of a glottal-source state for a spectrum of a glottal-source speech sound.

10. Speech processing apparatus as set forth in claim 1 wherein said second means includes means for electronically producing a set of signals representing coordinate values with a first coordinate value which is a function of a ratio of the values of frequency stored in the distinct memory locations, a second coordinate value which is substantially constant, and a third coordinate value which is a function of a ratio of the lowest frequency associated with an identified peak to a reference frequency value.

11. Speech processing apparatus as set forth in claim 1 wherein said memory means includes means for holding prestored phonetically relevant information corresponding to respective sets of addresses in the memory; and the apparatus further comprises means for electronically deriving a series of coordinate values of points on a path in a mathematical space as a function of repeatedly determined values of frequency selectively stored in the distinct memory locations when the auditory state signal represents a burst-friction sound, and means for electronically computing values of a trajectory parameter from the series of coordinate values, and when one of the values of the trajectory parameter satisfies a preestablished condition, determining an address in said memory means corresponding to coordinates of a position where the preestablished condition is satisfied, and for obtaining from the memory means the prestored phonetically relevant information corresponding to the address so determined.

12. Speech processing apparatus as set forth in claim 1 wherein said second means also includes means for electronically producing a set of coordinate values for a sensory pointer in a mathematical space from the values in the distinct memory locations; and the apparatus further comprises means for electronically deriving a series of coordinate values of a perceptual pointer on a path in the mathematical space with a contribution from the set of coordinate values for the sensory pointer, said memory means including means for holding prestored information representative of a speech stop sound at addresses corresponding to a region of the mathematical space which cannot be entered by the sets of coordinate values for the sensory pointer.

13. Speech processing apparatus comprising:
   memory means;
   first means for deriving from speech sets of digital values representative of frequency spectra, the spectra having peaks at particular frequencies, and for generating an auditory state signal representing the presence or absence of a burst-friction auditory state of the speech; and second means for electronically identifying in a frequency band below a preset frequency approximating six kiloHertz, when the auditory state signal indicates the presence of a burst-friction auditory state, the highest magnitude peak in the band for each spectrum as well as each peak having a magnitude within a number of decibels of the magnitude of the highest magnitude peak, which number is approximately ten decibels when the highest magnitude peak exceeds approximately 55 decibels and which number decreases with the magnitude of the highest magnitude peak at lesser magnitudes, and when the values of frequency of the lowest two particular frequencies of the identified peaks differ by less than approximately 2500 Hertz, selectively storing in distinct locations in the memory respectively representative of normally occurring prominences of a burst-friction sound the values of frequency of the lowest two particular frequencies of the identified peaks, and otherwise storing in the both of the distinct locations the value of the particular frequency of the identified peak which is lowest in frequency.

14. Speech processing apparatus as set forth in claim 13 wherein said first means includes means for supplying another auditory state signal indicative of a glottal-source state in response to a spectrum of a glottal-source speech sound.

15. Speech processing apparatus as set forth in claim 13 wherein said second means includes means for electronically producing a set of signals representing coordinate values with a first coordinate value which is a function of a ratio of the values of frequency stored in the distinct memory locations, a second coordinate value which is substantially constant, and a third coordinate value which is a function of a ratio of the lowest frequency associated with an identified peak to a reference frequency value.

16. Speech processing apparatus as set forth in claim 13 wherein said second means also includes means for electronically producing a set of coordinate values for a sensory pointer in a mathematical space from the values in the distinct memory locations; and the apparatus further comprises means for electronically deriving a series of coordinate values of a perceptual pointer on a path in a mathematical space with a contribution from the set of coordinate values for the sensory pointer, said memory means including means for holding prestored information representative of a speech stop sound at addresses corresponding to a region of the mathematical space which cannot be entered by the sets of coordinate values for the sensory pointer.

17. A speech processing method comprising the steps of:
deriving sets of digital values representative of frequency spectra from speech, the spectra having peaks at frequencies and the peaks including a highest magnitude peak for each spectrum;
generating an auditory state signal representing the presence or absence of a burst-friction auditory state of the speech;
electronically identifying, when the auditory state signal indicates the presence of a burst-friction auditory state, the highest magnitude peak for each spectrum as well as each peak having a magnitude within a range of magnitudes less than the magnitude of the highest magnitude peak; and
selectively storing in distinct locations in an electronic memory respectively representative of normally occurring prominences of a burst-fiction sound, the values of frequency of the lowest two particular frequencies of the identified peaks.

18. The method as set forth in claim 17 further comprising the step of storing in both distinct locations in the memory the lowest particular frequency of an identified peak, when the lowest two particular frequencies of the identified peaks differ by at least a predetermined value of frequency.

19. The method as set forth in claim 17 further comprising the step of storing in both distinct locations in the memory the value of frequency of the highest magnitude peak when there are no other identified peaks.

20. The method as set forth in claim 17 further comprising the step of varying the range of magnitudes in breadth directly with the intensity of the highest magnitude peak for intensities of the highest magnitude peak below a predetermined intensity.

21. The method as set forth in claim 17 wherein the electronic identifying step is limited to identifying only those peaks which are below a preset frequency.

22. The method as set forth in claim 17 further comprising the step of electronically producing a set of signals representing coordinate values with a first coordinate value which is a function of a ratio of the values of frequency stored in the distinct memory locations, a second coordinate value which is substantially constant, and a third coordinate value which is a function of a ratio of the lowest frequency associated with an identified peak to a reference frequency.

23. The method as set forth in claim 17 further comprising the steps of prestoring phonetically relevant information corresponding to respective sets of addresses in the electronic memory, electronically deriving a series of coordinate values of points on a path in a mathematical space as a function of the values of frequency selectively stored in the distinct memory locations when the auditory state signal represents a burst-friction sound, computing values of a trajectory parameter from the series of coordinate values, and when one of the values of the trajectory parameter satisfies a preestablished condition, determining an address in the electronic memory corresponding to coordinates of a position where the preestablished condition is satisfied, and obtaining from the electronic memory the prestored phonetically relevant information corresponding to the address so determined.

24. A speech processing method comprising the steps of:
deriving sets of digital values representative of frequency spectra from speech, the spectra having peaks at frequencies associated therewith;
generating an auditory state signal representing the presence or absence of a burst-friction auditory state of the speech;
electronically identifying in a frequency band below a first preset frequency, when the auditory state signal indicates the presence of a burst-friction auditory state, the highest magnitude peak in the band for each spectrum;
electronically establishing a number of decibels for a magnitude range for peaks, which number is substantially constant when the magnitude of the highest magnitude peak is at least equal to a preset amount and which number decreases with the magnitude of the highest magnitude peak for magnitudes less than the preset amount;

electronically identifying in the frequency band each peak having a magnitude within the established number of decibels of the magnitude of the highest magnitude peak; and selectively storing in distinct locations in the memory respectively representative of normally occurring prominences of a burst-friction sound the values of frequency of the lowest two particular frequencies of the peaks identified in the electronic identifying steps when the values of frequency of the lowest two particular frequencies of the identified peaks differ by less than a second preset frequency which is less than the first preset frequency, and otherwise storing in both of the distinct locations the value of frequency of the identified peak which is lowest in frequency.

* * * * *